US012001022B2

(12) United States Patent
Parker et al.

(10) Patent No.: US 12,001,022 B2
(45) Date of Patent: Jun. 4, 2024

(54) EXTENDED FIELD-OF-VIEW NEAR-TO-EYE WEARABLE DISPLAY

(71) Applicant: Marsupial Holdings, Inc., Waitsfield, VT (US)

(72) Inventors: William P. Parker, Waitsfield, VT (US); Julie Parker, Waitsfield, VT (US); Patrick Brophy, Waitsfield, VT (US)

(73) Assignee: Marsupial Holdings, Inc., Waitsfield, VT (US)

( * ) Notice: Subject to any disclaimer, the term of this patent is extended or adjusted under 35 U.S.C. 154(b) by 0 days.

(21) Appl. No.: 17/997,388

(22) PCT Filed: Apr. 30, 2021

(86) PCT No.: PCT/US2021/030293
§ 371 (c)(1),
(2) Date: Oct. 28, 2022

(87) PCT Pub. No.: WO2021/222826
PCT Pub. Date: Nov. 4, 2021

(65) Prior Publication Data
US 2023/0221558 A1 Jul. 13, 2023

Related U.S. Application Data

(60) Provisional application No. 62/704,251, filed on Apr. 30, 2020.

(51) Int. Cl.
*G02B 27/01* (2006.01)
*F21V 8/00* (2006.01)
*H04N 23/23* (2023.01)

(52) U.S. Cl.
CPC ....... *G02B 27/0172* (2013.01); *G02B 6/0073* (2013.01); *G02B 27/0101* (2013.01);
(Continued)

(58) Field of Classification Search
CPC .......... G02B 2027/0123; G02B 6/0073; G02B 27/0101; G02B 2027/0132;
(Continued)

(56) References Cited

U.S. PATENT DOCUMENTS 11,209,650 B1 * 12/2021 Trail .................... G02B 6/0023
2008/0186604 A1 * 8/2008 Amitai ............... G02B 27/0172
359/850

(Continued)

*Primary Examiner* — Temesghen Ghebretinsae
*Assistant Examiner* — Ivelisse Martinez Quiles
(74) *Attorney, Agent, or Firm* — Downs Rachlin Martin PLLC (57) ABSTRACT

An extended field-of-view near-to-eye display system provides for AR/MR image viewing over about a 180° FOV. The display system may include a multiplicity of display panels per eye of a user and may include both high- and low-resolution display capabilities. The high-resolution displays may be positioned in front of the user's eyes in their primary visual field while the low-resolution displays may be positioned so as to be seen by the user's peripheral vision. The low-resolution displays provide cueing information to the user out to the limit of visual perception (for each eye), placing encoded light and movement in the periphery of the user's vision for enhanced situational awareness.

10 Claims, 8 Drawing Sheets

(52) U.S. Cl.
 CPC ..... *H04N 23/23* (2023.01); *G02B 2027/0123* (2013.01); *G02B 2027/0132* (2013.01); *G02B 2027/0147* (2013.01)

(58) Field of Classification Search
 CPC ........... G02B 2027/0147; G02B 27/017–0172; H04N 23/23; H04N 13/344
 See application file for complete search history.

(56) References Cited

U.S. PATENT DOCUMENTS

| | | | | |
|---|---|---|---|---|
| 2014/0146394 | A1* | 5/2014 | Tout | G02B 26/10 359/630 |
| 2017/0285344 | A1* | 10/2017 | Benko | G06T 19/006 |
| 2020/0348518 | A1* | 11/2020 | Georgiou | G02B 17/0856 |

* cited by examiner

EXTENDED FIELD-OF-VIEW NEAR-TO-EYE WEARABLE DISPLAY

FIELD OF THE INVENTION

The present invention generally relates to headgear and goggles or helmet visor with augmented or mixed reality functionality. In particular, the present invention is directed to an extended field-of-view near-to-eye wearable display.

BACKGROUND

Augmented reality (AR) and mixed reality (MR) display systems that are integrated into headgear, e.g., helmets, goggles, and the like, are increasingly being adapted to many different applications, such as diving masks, first responder and military helmets, gaming systems, etc. While some applications require minimal adaption to be useful, e.g., darkening a room to allow for better visualization of digital images, other applications require better integration so as to render the equipment suitable for its intended purpose and providing adequate realism, e.g., a first responder's headwear or a military helmet being used in broad daylight. Conventional AR and MR display systems (e.g., Microsoft HoloLens, Magic Leap One, etc.) cannot be used in direct sunlight without adding brightness attenuators (e.g., sunshades), which block some of the light from the real world, and that can inhibit use in high dynamic range environments, such as when a user is transitioning from being outdoors to being indoors, then back to the outdoors. Moreover, current systems disrupt a user's natural vision, causing eye strain and/or reducing situational awareness of the real-world due to corrective optics distorting or blocking the real-world imagery that can be seen by the user through the system. Available systems are largely limited to 40° per eye and to 70° for binocular displays and the optics typically cause large distortions to natural vision. Moreover, these displays cannot be used in conjunction with night vision devices due to their size and the field-of-view (FOV) mismatch between the display and night vision devices. Similarly, current AR systems are bulky or do not integrate well with existing equipment worn by first responders or military personnel, e.g., the AR systems cannot fit between eye protection and night vision devices, and their weight causes user fatigue. Accordingly, there is a need for an AR/MR system that addresses these deficiencies and others.

SUMMARY OF THE DISCLOSURE

An extended field of view (FOV) display system is configured to be worn by a user such that the display system provides images in the user's FOV and includes a plurality of high-resolution displays (HRD), each of the HRDs configured to display an image in the user's FOV when the display system is worn by the user, wherein each of the plurality of HRDs are substantially see-through. A plurality of low-resolution displays (LRD) are also included, each of the LRDs configured to display angular cues in the user's peripheral FOV when the display system is worn by the user. The plurality of HRDs and the plurality of LRDs in combination are configured to display information over about 180° of the user's FOV when the display system is worn by the user.

Additionally or alternatively, the extended FOV display system of claim 1, wherein the plurality of HRDs include two central HRDs in the center of the user's FOV that provide respective angularly shifted displays to form a viewing zone in the user's FOV that includes binocular information.

Additionally or alternatively, the binocular viewing zone spans about 40° around a center of the user's FOV.

Additionally or alternatively, the plurality of HRDs includes a left HRD and a right HRD, wherein the left HRD forms a left HRD viewing zone that extends from an outer edge of the stereopsis viewing zone toward a left edge of the user's FOV and wherein the right HRD forms a right HRD viewing zone that extends from another outer edge of the stereopsis viewing zone toward a right edge of the user's FOV.

Additionally or alternatively, the plurality of LRDs includes a left LRD and a right LRD, wherein the left LRD extends from an outer edge of the left HRD viewing zone toward a left edge of the user's FOV and wherein the right HRD extends from an outer edge of the right HRD viewing zone toward a right edge of the user's FOV.

Additionally or alternatively, the left LRD and the right LRD are configured to display angular cuing elements out to about 110° from the center of the user's FOV.

Additionally or alternatively, the left LRD and the right LRD each include an array of LEDs attached to an image guide.

Additionally or alternatively, the array of colored LEDs are placed at an input of the image guide and encoded to provide changes in movement, color, and brightness in the displayed angular cuing elements.

Additionally or alternatively, the changes in movement, color, and brightness are based on inputs received from sensors.

Additionally or alternatively, each of the plurality of HRDs includes an imageguide element that is optically connected to a light engine.

Additionally or alternatively, images from the light engine are directed into and out of the imageguide element via an input optical element and an output optical element.

Additionally or alternatively, a lens between the light engine and the input optical element and wherein the lens is sized and configured to transmit the images from the light engine to the input optical element such that the images are transmitted through the imageguide element.

In another aspect of the invention, a device configured to be worn by a user such includes a left low-resolution display configured to display angular cuing elements in the user's left peripheral field of view when the device is worn by the user and a right low-resolution display configured to display angular cuing elements in the user's right peripheral field of view when the device is worn by the user.

Additionally or alternatively, the left low-resolution display and the right left low-resolution display each include an array of multicolor light sources.

Additionally or alternatively, the light sources are LEDs.

Additionally or alternatively, the device further includes a controller connected to the left low-resolution display and the right left low-resolution display and configured to receive information from a data source.

Additionally or alternatively, the data source is a sensor configured to detect objects in the user's peripheral field of view.

Additionally or alternatively, the controller instructs a selected one of the left low-resolution display or the right left low-resolution display to display a cueing element based on input received from the sensor.

Additionally or alternatively, the controller instructs the selected one of the left low-resolution display or the right left low-resolution display to modify the cueing element based on input received from the sensor.

Additionally or alternatively, the sensor is a thermal imaging device.

Additionally or alternatively, the sensor is a visible light sensor.

Additionally or alternatively, the sensor is a motion detector.

Additionally or alternatively, the sensor is a smart camera.

Additionally or alternatively, the sensor is a passive infrared detector.

Additionally or alternatively, the sensor is an acoustic sensor.

Additionally or alternatively, the left low-resolution display and the right left low-resolution display each include a substantially see-through imageguide.

Additionally or alternatively, the left low-resolution display and the right left low-resolution display each are opaque.

In another aspect, an extended field-of-view near-to-eye wearable display includes an extended FOV display system having an eye shield, a plurality of display panels on the eye shield, and a plurality of image projectors, each of the plurality of image projectors being light coupled to a respective one of the plurality of display panels. A first pair of the plurality of display panels are substantially see-through, are located on a portion of the eye shield corresponding to a center of a wearer's field of view, and are configured to display high resolution images to a user, wherein a second pair of the plurality of display panels are substantially see-through, are configured to display high resolution images to the user located, are located respectively on either lateral side of the first pair, and wherein a third pair of the plurality of display panels are located respectively on either later side of the first pair and are configured to display low resolution visual cues.

Additionally or alternatively, each of plurality of light coupled display panels and image projectors includes an imageguide element optically connected to a light engine.

In another aspect, a method for providing cueing information in a user's peripheral vision includes receiving a signal corresponding to information about a sensed object around the user, converting the signal to a visual cue that provides information about the object, generating a visual cue in an image projection system, and directing the visual cue for display in the user's peripheral vision.

Additionally or alternatively, the method further includes modifying the low resolution visual cue based on receiving another signal corresponding to information about the sensed object.

Additionally or alternatively, the method further includes generating the visual cue with an array of LEDs.

Additionally or alternatively, the directing includes directing the visual cue by internal reflection through an imageguide element.

In another aspect, a system for providing information to a user's peripheral field of view includes a device configured to be worn by the user and a low-resolution display attached to the device and configured to display angular cues in the user's peripheral field of view when the device is worn by the user.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

An extended field-of-view near-to-eye display system according to the present disclosure provides for AR/MR image viewing and/or visual cueing information over about a 180° FOV. In certain embodiments, the display system includes three display panels per eye of a user. In certain embodiments, the display system includes both high- and low-resolution display capabilities. In certain embodiments, high-resolution displays are in front of the user's eyes, while the low-resolution displays are positioned so as to be seen by the user's peripheral vision. In certain embodiments, the display system includes two high-resolution imageguide image guide displays per eye and adds a third display element that provides low resolution cueing information.

In certain embodiments, cueing elements are provided out to 110° (for each eye of the user), placing light and movement in the periphery of the user's vision for enhanced situational awareness. A person's primary visual field (sometimes referred to as the perceptual span) is the field of view where they can read text, understand graphics or symbols, identify faces or objects by their shape and other tasks that require resolving details. This field is limited to less than ±30° as compared to the entire field of view of their eyes of approximately 190°. Even with eye movement, the primary field is limited to much less than the entire visual field of the eye where it is able to receive and interpret light as having some meaning. Outside of the primary visual field, in what is known as peripheral vision, a person can receive useful information that contributes significantly to their situational awareness and has a high value for real world survival. The difference between life and death can be whether something or some activity was merely perceived in the periphery of a person's vision thus cuing the person to react. These areas of a person's visual field, although not capable of high-resolution details identifiable in the primary visual field, are particularly sensitive to changes of light intensity and movement which a person interprets as cues and which can elicit attentiveness and danger avoidance, contributing to their safety and survival in a dynamic environment. Current AR systems are not designed to provide information via visual cues to the peripheral vision of a user.

Figure 1:
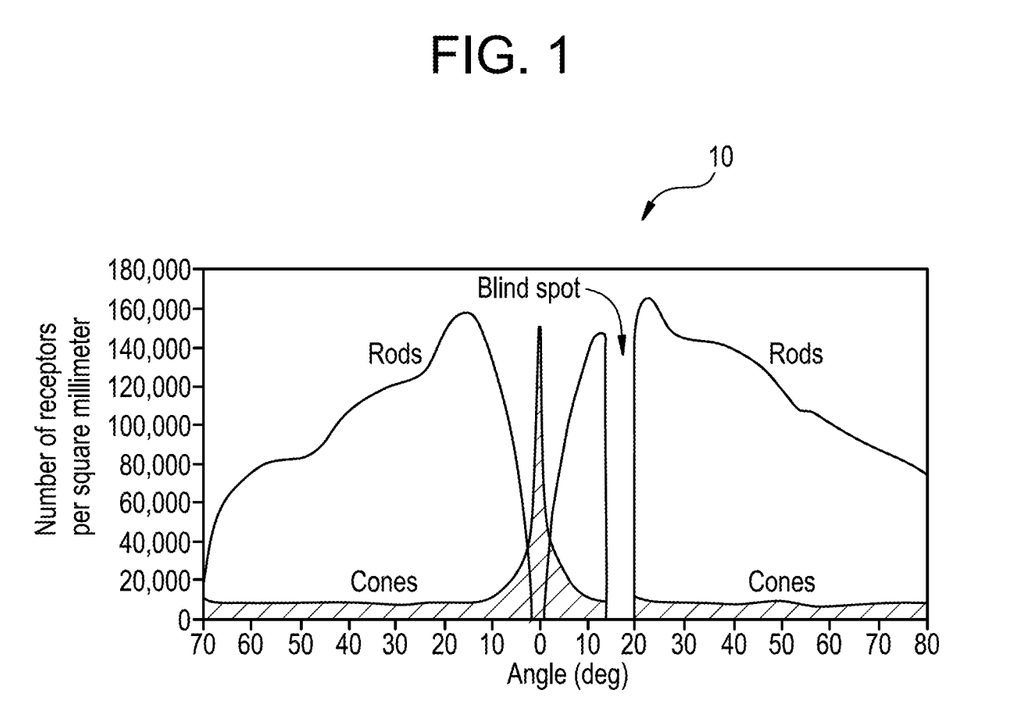
FIG. 1 is a graph of cone cell distribution across the retina.

Turning now to the figures, and particularly, FIG. 1, there is shown a graph of light receptor cell distribution in a human eye. Most image information obtained by the human eye is from a small, high-resolution part of the visual field. The remaining FOV is unfocused. Thus, given the central 5° fovea resolution of the retina, any high-resolution imagery displayed beyond roughly ±45° FOV (about 90° total) is indistinguishable by the user. Advantageously, this provides an opportunity to reduce the size, weight, power, and cost of a display system that offers extended FOV AR/MR imagery.

Figure 2:
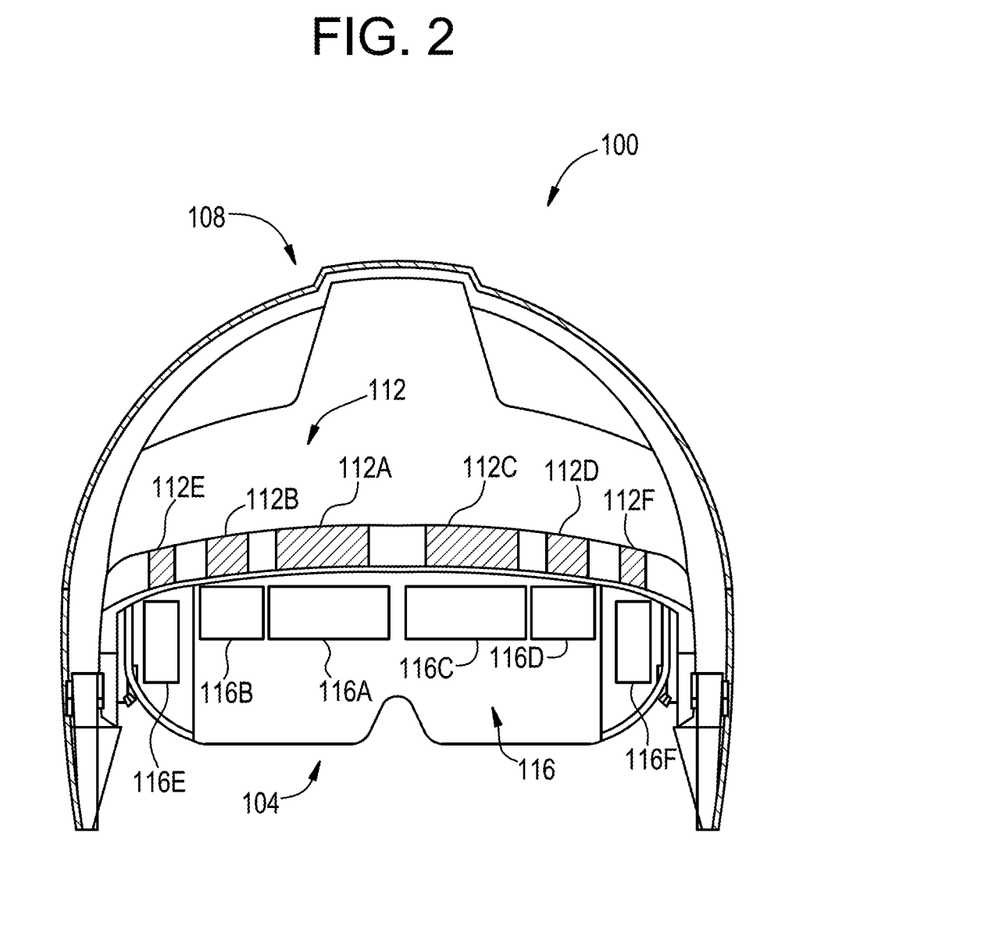
FIG. 2 is a plan view of a helmet with an extended FOV display system according to an embodiment of the present invention.

FIG. 2 shows an embodiment of an extended FOV display system (EDS) 100 integrated with an eye shield 104 of a helmet 108. EDS 100 includes, in this embodiment, a plurality of image projectors 112 (e.g., 112A-112F), each of which are light coupled to a respective display panel 116 (e.g., 116A-116F). Two display panels 116 are placed in front of each of a user's eyes, e.g., in EDS 100 shown in FIG. 2, display panels 116A and 116B are in front of the user's right eye and display panels 116C and 116D are in front of the user's left eye. In an embodiment, each of the display panels 116A-116D placed in front of the user's eye is a high-resolution display panel. Display panels 116E and 116F are located on opposing peripheries of eye shield 104 and are low-resolution display panels. Although EDS 100 is shown as integrated into an eye shield of a helmet, an EDS according to the present disclosure can be integrated into many other form factors, such as, but not limited to, wrap around eye glasses, goggles, and facemasks. In addition, a form factor may include only the peripheral displays, either standing alone on either side of the user's face or as part of an eye shield or visor that does not include other displays in front of the user's eyes or incorporated with another kind of display such as a virtual reality display or night vison goggle.

Figure 3:
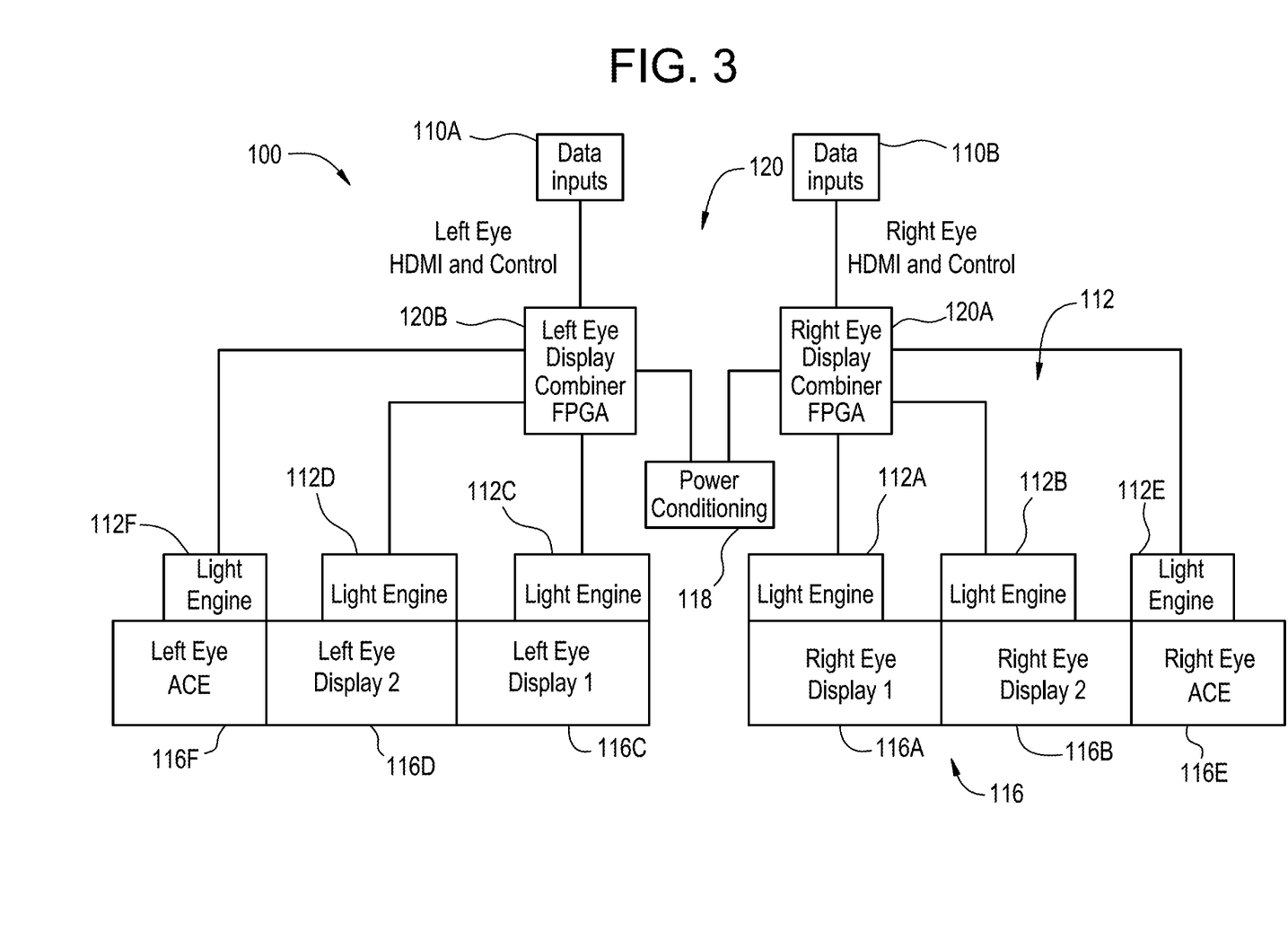
FIG. 3 is a block diagram of an extended FOV display system according to an embodiment of the present invention.
Figure 6:
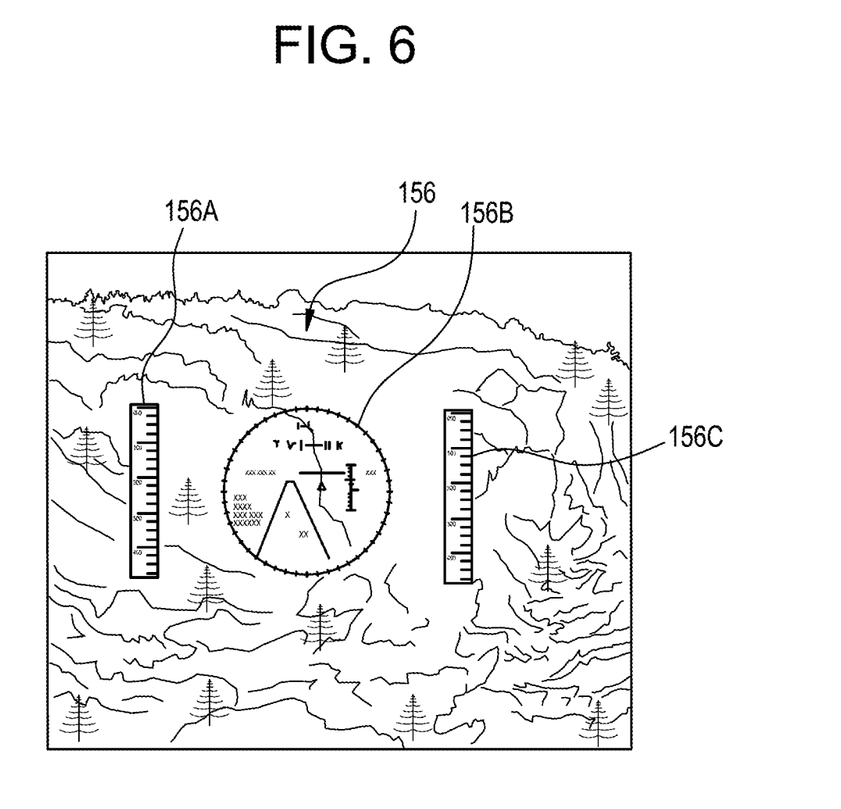
FIG. 6 is an illustration depicting information displayed in the field of view of a user through an extended FOV display system according to an embodiment of the present invention.

A generalized block diagram of an EDS, such as EDS 100, is shown in FIG. 3. In this embodiment, EDS 100 includes a power conditioning module 118 that is suitable for providing appropriate power voltage and current to image projectors 112. Power conditioning module 118 can convert direct current power provided by, for example, a battery or solar panel, to a voltage appropriate for other components of EDS 100. EDS 100 can also include one or more display combiners 120 (e.g., right eye and left eye combiners 120A and 120B, respectively), which assist with integrating multiple data streams from multiple data sources 110 or output from graphic processors for presentation onto one or more of displays 116 via each display's respective image projectors 112. For example, and as shown in FIG. 6, multiple pieces of information 156 (e.g., 156A, 156B, 156C) can be displayed to the user via displays 116. Further, angular cuing elements (ACE, examples of which can be seen in FIG. 7), instead of imagery or other data such as text, are shown in peripheral displays 116E and 116F, Combiners 120 may include field programmable gate array processors (FPGA) to allow for users to select what information will be displayed and update how information will be displayed through software or firmware updates. Each combiner 120 is in electronic communication to a plurality of image projectors 112. For example, combiner 120A is in electronic communication with image projectors 112A, 112B, and 112E and combiner 120B is in electronic communication with image projectors 112C, 112D, and 112F. In this way, combiner 120A can send multiple streams of information to one or more of image projectors 112A, 112B, and 112E. In an embodiment, combiners 120 provide sensor-based information, e.g., speed, heading, altitude, GPS location, guidance information, etc., in the high-resolution viewing area (discussed further below with reference to FIG. 4) and situational awareness information in the low-resolution areas, e.g., indications of people, actions or things on the user's periphery (discussed in more detail below with respect to FIG. 7).

Figure 4:
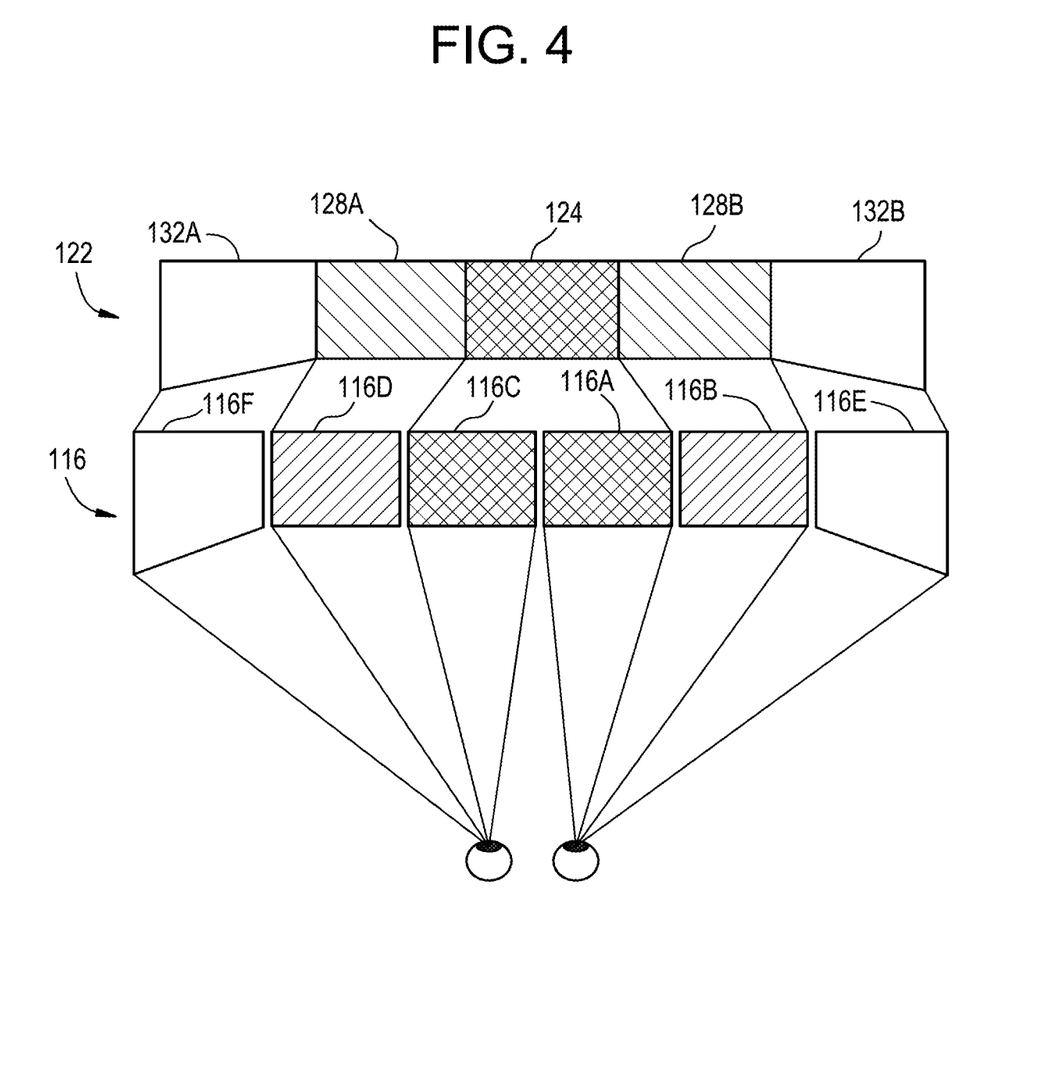
FIG. 4 is an illustration depicting the field-of-view zones of an extended FOV display system according to an embodiment of the present invention.
Figure 7:
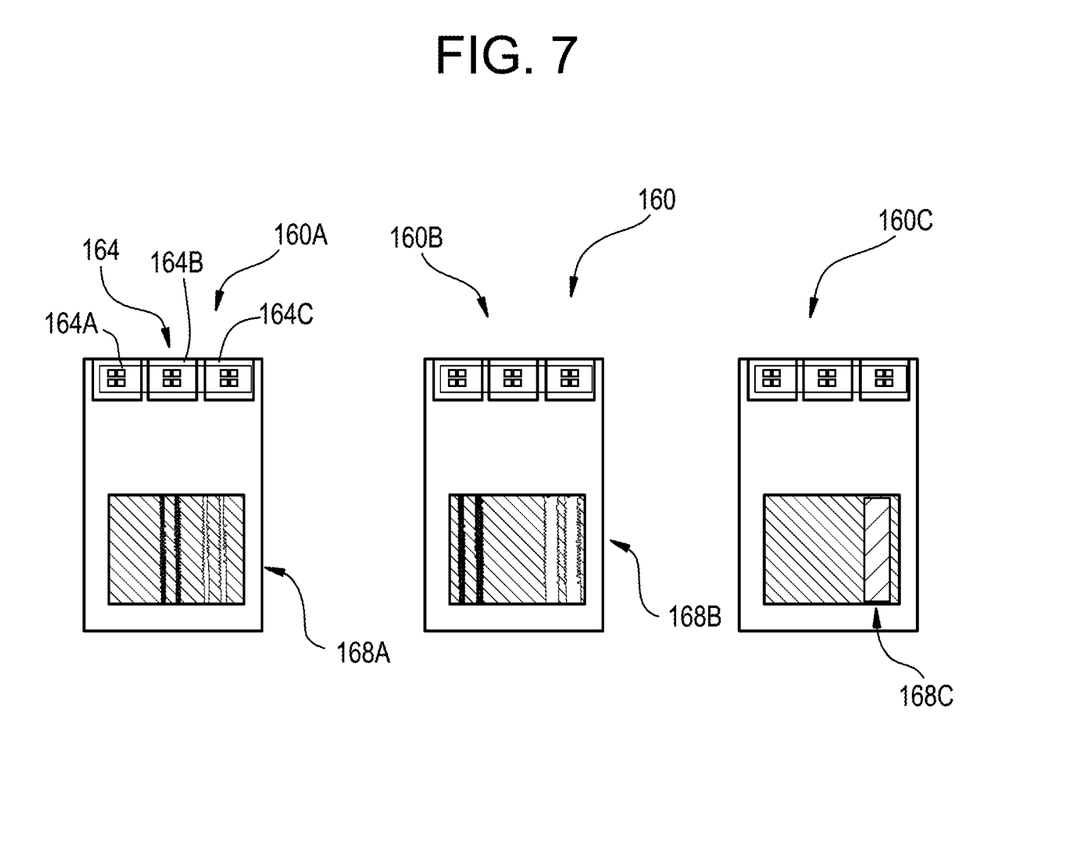
FIG. 7 shows illustrations depicting information displayed on peripheral viewing panels of the extended FOV display system according to an embodiment of the present invention.

The combination of display panels 116 provides the user, when EDS 100 is worn by the user and display panels 116 are arranged as described herein, with about a 180° FOV with respect to display panels 116, which advantageously allows for many types of information to be presented to the user simultaneously. The FOV and exemplary information that can be displayed therein by EDS 100 is depicted in FIGS. 4, 6, and 7, which show a FOV 122 (FIG. 4) for a user using a device employing EDS 100 and examples of the types and locations of information that can be displayed in the high-resolution zones (FIG. 6) and the low-resolution zones (FIG. 4B).

Display panels 116 (as shown in FIGS. 2, 3, and 4A) combine to create FOV 122 that has different viewing zones. Center display panels 116A and 116C combine to provide an overlap area (e.g., 40° around the center of the FOV) that creates a single viewing zone 124. Viewing zone 124 therefore allows binocular information to be displayed via angularly shifted images allowing the user to perceive depth. Display panels 116B and 116D provide a pair of high-resolution viewing areas 128 (i.e., 128A and 128B), one for each eye and each having a viewing span beginning at the edge of viewing zone 124 and extending away from the center of the FOV, which may span, for example, 40°. And the outermost peripheral display panels 116E and 116F provide a pair of low-resolution viewing areas 132 (e.g., 132A and 132B), one for each eye and extending from at or near the edge of a respective viewing area 128 away from the center of the FOV, which may span, for example, 30°. When taken together, these viewing zones of EDS 100 provide about 180° FOV for imagery (e.g., AR/MR imagery) and/or ACE to be displayed to the user and thus substantially overlap the user's eyesight complete FOV.

Figure 5:
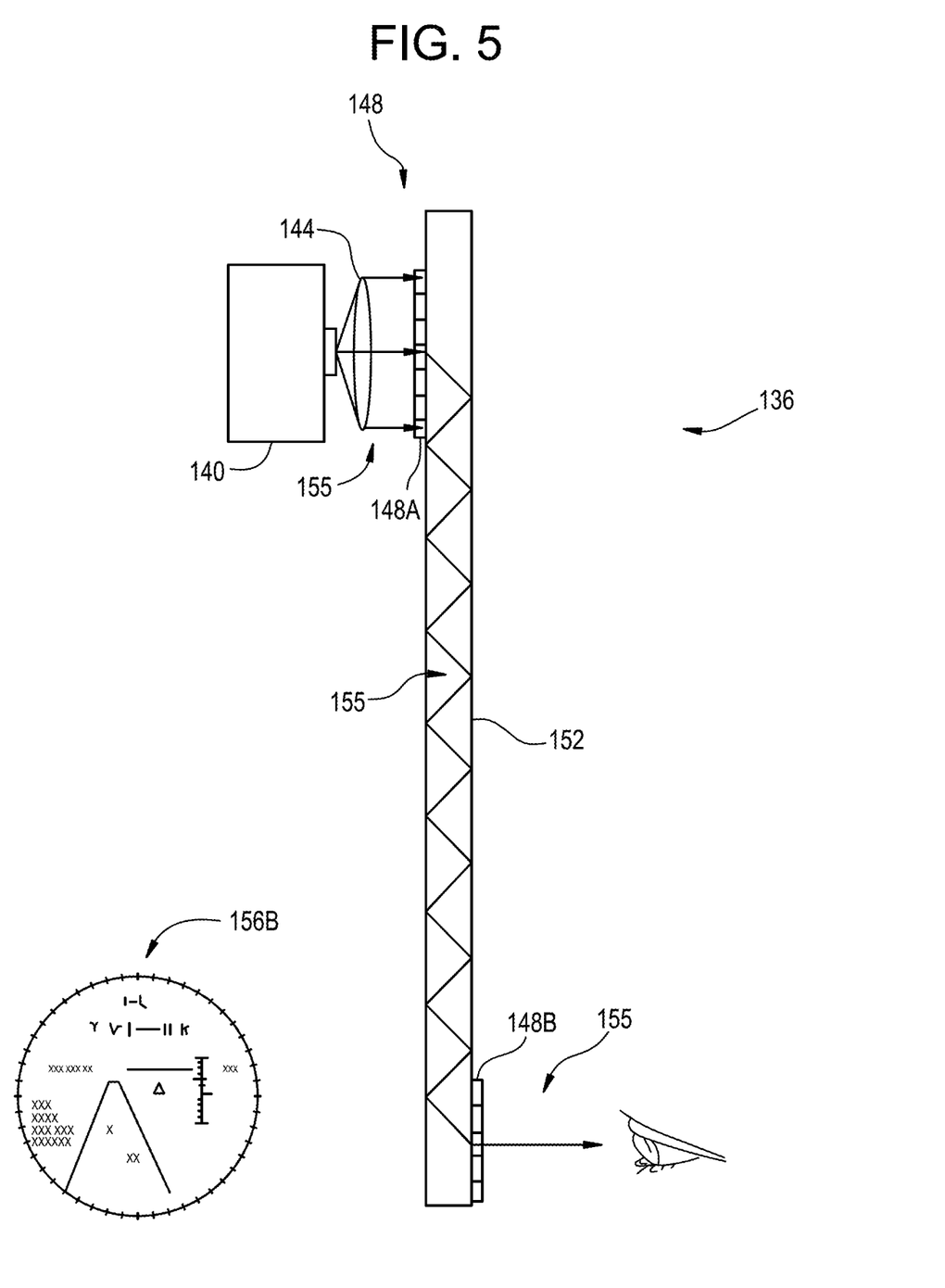
FIG. 5 is a schematic view of an imageguide image combiner display system according to an embodiment of the present invention.

So as to have the desired, images and ACE appear in these viewing zones, substantially see-through imageguide display systems can be used, such as an imageguide display system 136 shown in FIG. 5. Imageguide display system 136 provides images and information, described in more detail below, to the user that is overlaid, in a substantially see-through fashion, upon the real-world scene that is viewable through display panels 116. In an embodiment, an imageguide display system 136 is optically connected to each respective image projector 112, which includes a light engine 140. Imageguide display system 136 additionally can include a lens 144, one or more diffraction gratings or holographic optical elements (HOE) 148 (e.g., input HOE 148A and output HOE 148B), and an image guiding element 152, which is a transparent plate that uses total internal refection to move the image from input HOE 148 to output HOE 148B. The foregoing components combine to produce a virtual image 156B that appears as a floating image in the FOV of the user in the high-resolution viewing zones or ACE (e.g., ACE 168A in FIG. 7) in the peripheral viewing zones. In operation, light engine 140 produces viewable information (received from combiner 120) that is directed to lens 144, then to input HOE 148A for propagation along image guiding element 152 to output HOE 148B, which directs the viewable information to the user's eyes as a bundle of light rays 155. Although FIG. 5 shows that input HOE 148A and output HOE 148B are on opposing sides of image guiding element 152, input HOE 148A and output HOE 148B may be positioned on the same side of an image guide and on either face of the image guiding element 152. Adjacent panels can be tiled in such a way as the user perceives a continuous view throughout the viewable visual field without breaks or discontinuities. The maximum resolution of each display panel can be optimized to match the visual resolution of the specific areas of the user's visual field that they cover. The resolution can also be changed dynamically with a system that monitors the user's point of gaze and adjusts the resolution of the visual information at the data source 110 or combiner 120 to correspond with the user's current point of gaze.

Light engine 140 can produce a full color, sunlight readable, high resolution image, such as virtual image 156B, or ACE, such as ACE 168A, for transmission to eyes of a user wearing EDS 100. The image produced by imageguide display system 136 can be read against the brightest scenery (e.g., a sunlit cloud in the sky), while still dimming enough to be compatible with nighttime applications.

Light engine 140 and/or combiner 120 may include a data source or a processor 110 (e.g., 110A, 110B in FIG. 3) and receives information from one or more inputs. The processor is preferably a high performance, low power processor with accelerated image processing, capable of executing a set of instructions (described in more detail below) such that light engine 140 can produce an image based on the inputs. Additionally, in certain embodiments, the processor can co-align off-axis optical systems to the real world viewed. For example, the processor can align inputs from a thermal imaging camera (not shown) or an extended optical zoom camera (not shown) that are mounted onto, for example, helmet 108. The processor can provide real-time image processing from a video input, such as high dynamic range processing, sensor fusion, contrast enhancement, and low-light processing. In certain embodiments, the processor, in combination with the inputs, provides spatially-referenced augmented reality information when connected real-time or with preloaded object location information. Inputs to the system can be sensor based or synthetic, as in a simulation of real-world objects or events, or a combination of both.

Lens 144 is sized and configured to transmit the display information from light engine 140 to input HOE 148A such that the display information can be transmitted through image guiding element 152. In some embodiments lens 144 is not required such as when the light engine is a laser scanning projector. Input HOE 148A or output HOE 148B may also have some of all of the optical functions of lens 144 included into their design.

HOEs 148 are translucent diffraction elements or holographic optical elements (HOE's) that are designed and configured to steer displayable information into and out of image guiding element 152. In an embodiment, HOEs 148 are capable of directing displayable information through image guiding element 152 using total internal reflections. As shown in FIG. 5, input HOE 148A receives displayable information received from light engine 140 so as to direct the information to be displayed through image guiding element 152 toward output HOE 148B. Output HOE 148B directs the display information to the user to be viewed when looking through shield 104 (as seen in FIG. 2). In an embodiment, HOEs 148 are prepared using laser beam interference techniques. For example, two laser beams may be directed at a substrate so as to produce a pattern of straight lines with a sinusoidal cross section, with the pitch of the grating being approximately $\lambda/\sin\theta$. Although FIG. 5 shows input HOE 148A positioned between lens 144 and image guiding element 152, the HOE could also be positioned on the opposite side of the image guide. Additionally, although output HOE 148B is shown being positioned between the user's eye and image guiding element 152, the HOE could be placed on the other side of the image guide.

Image guiding element 152 is a plate that propagates light waves substantially internally accomplished with total internal reflection. Image guiding element 152 can be many different shapes, including but not limited, to rectangular, other quadrilateral shapes, or other multisided shapes, and circular or oval shapes.

As discussed above, image projectors 112 receive one or more signal inputs from a respective display combiner 120 or other signal sources not shown. The sources for inputs can include, but are not limited to, a video input, real-time digitally generated graphic information, pre-rendered graphics, a rangefinder input, a global position system coordinate or related information.

Imageguide display system 136 can include additional optical components. The use of additional optical components in the light path from light engine 140 to the user may be necessary to place an image into appropriate focus for the user. The optical components can assist with alignment and focus between the real-world view and the content displayed to the user, as well as correct for image distortions or compensate for the user's uncorrected eyesight. The optical components can be refractive, diffractive, or hybrid optical elements. Various combinations of optical elements may be used so as to properly align and focus the images for viewing.

As discussed previously, EDS 100 provides information to the user about a 180° FOV, or greater; however, a person cannot see in high-resolution at the periphery of their vision. This presents an opportunity to provide useful and critical information to the user while simultaneously save weight, power, and processing resources by providing, in zones 132A and 132B (FIGS. 4A-4B) low-resolution viewing zones. In an embodiment, color, light and movement are displayed in these low-resolution zones, but not detailed images. In an embodiment, the peripheral display zones 132A and 132B are provided information by arrays of colored LED's attached to an image guide, in which the arrays are spaced in order to provide the user with unambiguous cues about an element of interest, such as the angle of a detected object with respect to the user. While it is known that color sensing drops off over viewing angle by wavelength (i.e., blue is lost first, then green, yellow, and red, with the ability to sense white being lost last), arrays of multicolor light sources such as LED's can be placed at the input of the image guide and be encoded to provide subtle movement, color, and brightness changes to light (angular cuing elements (ACE)) appearing in display zones 132A and 132B in the user's peripheral vision for enhanced situational awareness. In this way, these low-resolution displays can provide color, intensity and movement cues in the user's peripheral vision zones that enable enhanced situational awareness from mixed reality data streams, simulated environments or in response to an outside stimulus or sensor inputs. Combiners 120A-B, or other signal processing systems upstream of 120A-B (not shown), are programmed to receive information from a variety of data streams, sensors or other signals and encode that information into characteristic light patterns with an approximate angular registration and apply that information using the peripherally located Angular Cuing Element (or ACE) that the user then perceives and translates into useful situational awareness cues.

Although some cues may be intuitive, additional user training could be necessary to allow the ACE to convey even more specific useful information. While LED's have been used in the example described above, other light sources could be used, such as, but not limited to, laser diodes, SLED's, OLEDs, micro-LEDS, or a backlit LCD device. In some situations, such as in a virtual reality headset or other non-transparent viewing device, these sources of visual cues could be provided in the area of the user's peripheral vision without a corresponding image guide. In this way, information via ACE may be provided by an occluded or partially occluded panel in the peripheral vision of the user, instead through the largely transparent image guide to receive the cues.

FIG. 7 depicts simplified illustrations of low-resolution display systems 160 (e.g., 160A-180C) that could be used for low-resolution zones 132, which can extend to the limits of the user's peripheral vision. In this example, each display system 160 includes a plurality of LED's 164 (e.g., 164A-164C) that transmit, via total internal reflection, such as through a waveguide or image guiding element, information that is visible to the user as a low-resolution image 168 (e.g., 168A-168C), where the image is patterns of light that are visible to the user in their peripheral vision when EDS 100 is worn. Although specific examples are discussed below, in general, the use of colors, line thickness, shapes, spacing, intensity, and other light effects can be employed to give the user valuable situational awareness information in their peripheral vision. (For clarity, the terms "forward and front" mean closer to the user's primary vision zone, i.e., in front of the user, whereas the terms "backward and back" mean toward the back of the user's head and the outer edges of viewable range. In addition, for simplicity each of the displays discussed are for the user's right eye.)

Display 160A presents information to the user's right eye peripheral vision that could indicate a slow object at 900 to the user and at a distance of 10 meters from the user and a fast object approaching at 100° and at 20 meters. In this example, the 90° location is inferred from the location of the two yellow lines, the use of yellow indicates the speed, and the spacing between the yellow lines is indicative of the distance. The red lines in this example indicate a lagging object (lines are to the right (in back) of the yellow lines), a faster moving object (lines are red), and the lines are slightly further apart, indicating a further distance. Display 160B presents information to the user that could indicate a slow object pulling ahead 85° and a fast object at 175° approaching at 5 meters. In this example, the yellow lines have moved toward the front of the user's peripheral vision and have maintained the same distance away and speed. The fast object has moved further back in the user's peripheral vision, but is moving faster (thicker red lines) and is closer (smaller space between red lines). Display 160C presents information to the user that could indicate a muzzle flash at 165° at close range. In this example, a large white line depicts an event that occurred near the far edge of the user's peripheral vision.

Figure 8:
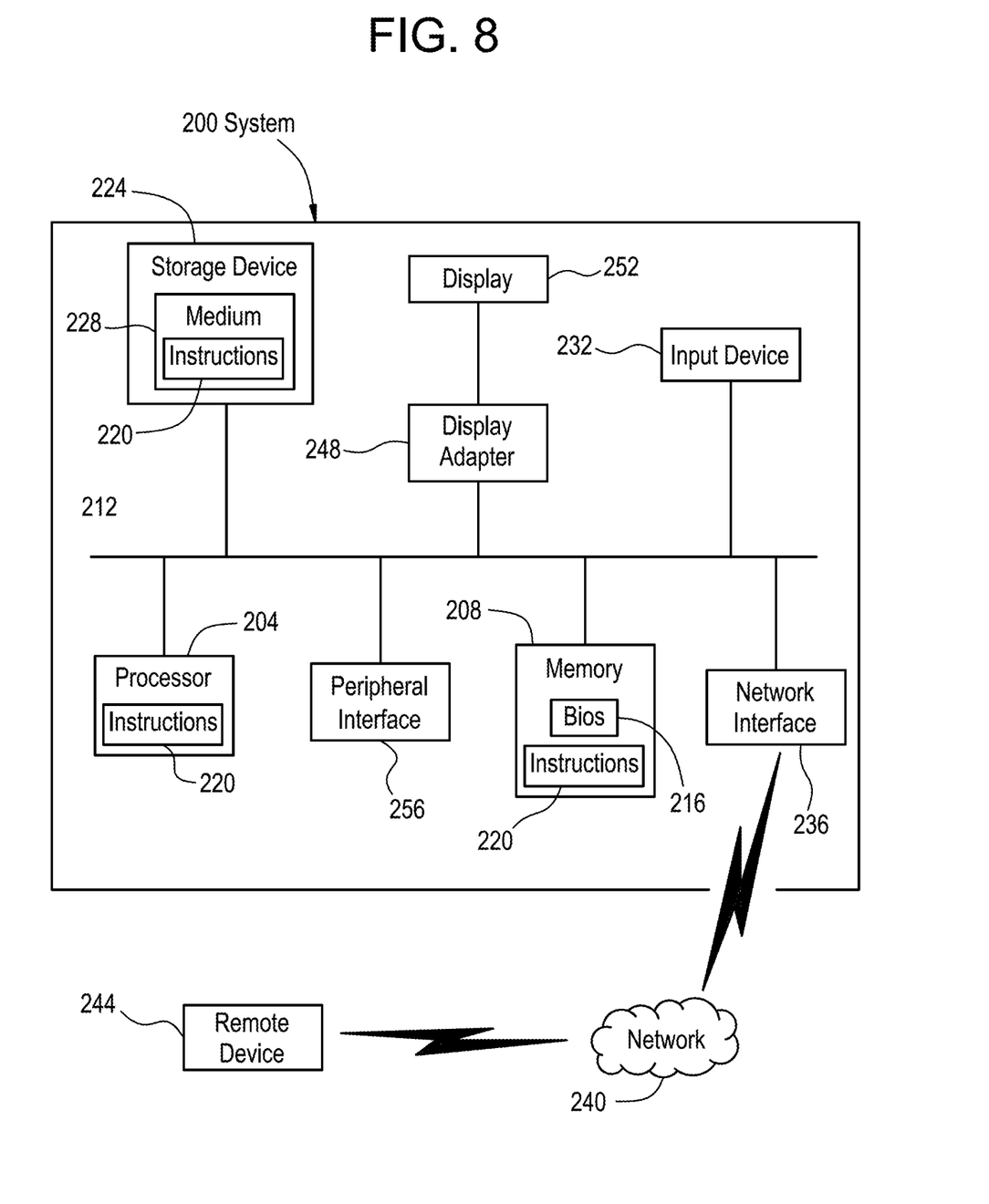
FIG. 8 is a computing system according to an embodiment of the present invention.

FIG. 8 shows a diagrammatic representation of one implementation of a machine/computing device 200 that can be used to implement a set of instructions for causing one or more components of an imageguide display system, for example, image projector 112 and light engine 140, to perform any one or more of the aspects and/or methodologies of the present disclosure. In general, an EDS may be implemented as part of a helmet visor, however, other embodiments of all or portions of the EDS may be implemented as a wearable or body-mountable display device (also referred to as a wearable computing device), such as a head-mountable device (HMD), or display that may be attached or mounted to other portions of the user, such as by an arm-band, wrist band, wrist mount, or a chest-mount system, among other possibilities.

Device 200 includes a processor 204 and a memory 208 that communicate with each other, and with other components, such as displays 160, via a bus 212. Processor 204 can be, for example, a micro-processor, a graphics processing unit or a digital signal processor. Bus 212 may include any of several types of communication structures including, but not limited to, a memory bus, a memory controller, a peripheral bus, a local bus, and any combinations thereof, using any of a variety of architectures.

Memory 208 may include various components (e.g., machine-readable media) including, but not limited to, a random-access memory component (e.g., a static RAM "SRAM", a dynamic RAM "DRAM", etc.), a read-only component, and any combinations thereof. In one example, a basic input/output system 216 (BIOS), including basic routines that help to transfer information between elements within device 200, such as during start-up, may be stored in memory 208. Memory 208 may also include (e.g., stored on one or more machine-readable media) instructions (e.g., software) 220 embodying any one or more of the aspects and/or methodologies of the present disclosure. In another example, memory 208 may further include any number of program modules including, but not limited to, an operating system, one or more application programs, other program modules, program data, and any combinations thereof.

Device 200 may also include a storage device 224. Examples of a storage device (e.g., storage device 224) include, but are not limited to, a hard disk drive for reading from and/or writing to a hard disk, a flash-drive, solid-state memory device, or other memory devices known in the art and any combinations thereof. Storage device 224 may be connected to bus 212 by an appropriate interface (not shown). Example interfaces include, but are not limited to, SCSI, advanced technology attachment (ATA), serial ATA, universal serial bus (all types) (USB), IEEE 1395, and any combinations thereof. In one example, storage device 224 may be removably interfaced with device 200 (e.g., via an external port connector). Particularly, storage device 224 and an associated machine-readable medium 228 may provide nonvolatile and/or volatile storage of machine-readable instructions, data structures, program modules, and/or other data for image projector 112 or light engine 140. In one example, instructions 220 may reside, completely or partially, within machine-readable medium 228. In another example, instructions 220 may reside, completely or partially, within processor 204.

Device 200 may also include a connection to one or more inputs/sensors and/or source devices 212. Sensors may be interfaced to bus 212 via any of a variety of interfaces (not shown) including, but not limited to, a serial interface, a parallel interface, a game port, a USB interface, a FIREWIRE interface, a direct connection to bus 212, wireless, and any combinations thereof. Alternatively, in one example, a user of device 200 may enter commands and/or other information into device 200 via an input device. Examples of an input device 232 include, but are not limited to, an alpha-numeric input device (e.g., a keyboard), a pointing device, an audio input device (e.g., a microphone, a voice response system, etc.), a cursor control device (e.g., a mouse), a touchpad, an optical scanner, a video capture device (e.g., a still camera, a video camera), touchscreen, and any combinations thereof.

A user may also input commands and/or other information to device 200 via storage device 224 (e.g., a removable disk drive, a flash drive, etc.) and/or a network interface device 236. A network interface device, such as network interface device 236, may be utilized for connecting device 200 to one or more of a variety of networks, such as network 240, and one or more remote devices 244 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 240, may employ a wired and/or a wireless mode of communication. In general, any network topology may be used. Information (e.g., data, instructions 220, etc.) may be communicated to and/or from device 200 via network interface device 236.

In some embodiments, device 200 may receive video, sensor, simulated images or other data wirelessly according to one or more wireless standards or protocols, such as, but not limited to, RFID, Bluetooth, Wi-Fi, ZigBee, WiMax, WiGig, Ultra Wide Band, or a Wireless Wide Area Network (e.g., TDMA, CDMA, GSM, UMTS, EV-DO, LTE), etc. In other embodiments, processing device 200 may receive the video, sensor, or other data by one or more wired protocols such as, but not limited to, a Universal Serial Bus protocol, a Registered Jack protocol (e.g., RJ-25), or a wired Local Area Network protocol (e.g., Ethernet). In other examples, video, sensor, and other data may be received by the processing device from a portable storage device such as a memory card, flash drive, or zip drive.

Device 200 may further include a video display adapter 248 for communicating a displayable image to a display device 252. Examples of a display device 252 include, but are not limited to, an imageguide display, a liquid crystal display (LCD), a laser scanner, a plasma display, and any combinations thereof.

In addition to display device 252, device 200 may include a connection to one or more other peripheral output devices including, for example, an audio speaker. Peripheral output devices may be connected to bus 212 via a peripheral interface 256. Examples of a peripheral interface include, but are not limited to, a serial port, a USB connection, a FIREWIRE connection, a parallel connection, a wireless connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An extended field of view (FOV) display system configured to be worn by a user such that the extended FOV display system provides images in a user's FOV, the extended FOV display system comprising:
  a plurality of high-resolution displays (HRD), each of the plurality of HRDs configured to display an image in the user's FOV when the extended FOV display system is worn by the user, wherein each of the plurality of HRDs are substantially see-through; and
  a plurality of low-resolution displays (LRD), each of the plurality of LRDs configured to display angular cues in a user's peripheral FOV when the extended FOV display system is worn by the user,
  wherein the plurality of HRDs and the plurality of LRDs in combination are configured to display information over about 180° of the user's FOV when the extended FOV display system is worn by the user, wherein the plurality of HRDs include a pair of central HRDs that in combination form an overlap viewing area in a center of the user's FOV that provides a binocular viewing zone in the user's FOV, wherein the plurality of HRDs further include a left HRD and a right HRD, wherein the left HRD is positioned left of the pair of central HRDs and forms a left HRD viewing zone that extends from an outer edge of the overlap viewing area toward a left edge of the user's FOV, and wherein the right HRD is positioned right of the pair of central HRDs and forms a right HRD viewing zone that extends from another outer edge of the overlap viewing area toward a right edge of the user's FOV.

2. The extended FOV display system of claim 1, wherein the binocular viewing zone spans about 40° around the center of the user's FOV.

3. The extended FOV display system of claim 1, wherein the plurality of LRDs includes a left LRD and a right LRD, wherein the left LRD extends from an outer edge of the left HRD viewing zone toward the left edge of the user's FOV and wherein the right HRD extends from an outer edge of the right HRD viewing zone toward the right edge of the user's FOV.

4. The extended FOV display system of claim 3, wherein the left LRD and the right LRD are configured to display angular cuing elements out to about 110° from the center of the user's FOV.

5. The extended FOV display system of claim 4, wherein the left LRD and the right LRD each include an array of light emitting diodes (LEDs) attached to an image guide.

6. The extended FOV display system of claim 5, wherein each of the left LRD and right LRD array of LEDs are placed at an input of the image guide and encoded to provide changes in movement, color, and brightness in the displayed angular cuing elements.

7. The extended FOV display system of claim 6, wherein the changes in movement, color, and brightness are based on inputs received from sensors.

8. The extended FOV display system of claim 1, wherein each of the plurality of HRDs includes an image element that is optically connected to a light engine.

9. The extended FOV display system of claim 8, wherein images from the light engine are directed into and out of the image element via an input optical element and an output optical element.

10. The extended FOV display system of claim 9, wherein a lens between the light engine and the input optical element and wherein the lens is sized and configured to transmit the images from the light engine to the input optical element such that the images from the light engine are transmitted through the image guide element.

* * * * *